United States Patent [19]
Brooks et al.

[11] 3,798,539
[45] Mar. 19, 1974

[54] PULSE EDDY CURRENT TESTING APPARATUS USING PULSES HAVING A 25% DUTY CYCLE WITH GATING AT PULSE EDGES

[75] Inventors: Robert A. Brooks, Rye; Paul J. Bebick, Bronx, both of N.Y.

[73] Assignee: Magnetic Analysis Corporation, Mt. Vernon, N.Y.

[22] Filed: Feb. 15, 1973

[21] Appl. No.: 332,874

[52] U.S. Cl. .............................................. 324/40
[51] Int. Cl. ............................................ G01r 33/12
[58] Field of Search .............................. 324/37, 40

[56] References Cited
UNITED STATES PATENTS

| | | |
|---|---|---|
| 2,965,840 | 12/1960 | Renken et al. .................. 324/37 |
| 3,229,197 | 1/1966 | Renken, Jr. ..................... 324/40 |
| 3,235,795 | 2/1966 | Uozomi .......................... 324/40 |
| 3,361,960 | 1/1968 | Renken, Jr. et al. ............. 324/40 |
| 3,391,336 | 7/1968 | Hentschel ....................... 324/37 |

Primary Examiner—Robert J. Corcoran
Attorney, Agent, or Firm—Pennie & Edmonds

[57] ABSTRACT

Pulses having a pulse width equal to one-quarter wavelength at a multiple (including 1) of the fundamental frequency of the pulses are applied to the test coil assembly of a pulse eddy current testing apparatus, and the output signals are supplied to an amplifier tuned to said multiple of the fundamental frequency. The output of the amplifier is supplied to a pair of phase-sensitive detectors which are gated at the leading and trailing edges of the applied pulses to produce quadrature signal components. These components are utilized to produce indications of defects or flaws in the object under test. The test coil assembly is advantageously designed to produce an approximately null output in the absence of defects or flaws. The pulses may have a 25 percent duty cycle with the amplifier tuned to the PRF thereof.

9 Claims, 3 Drawing Figures

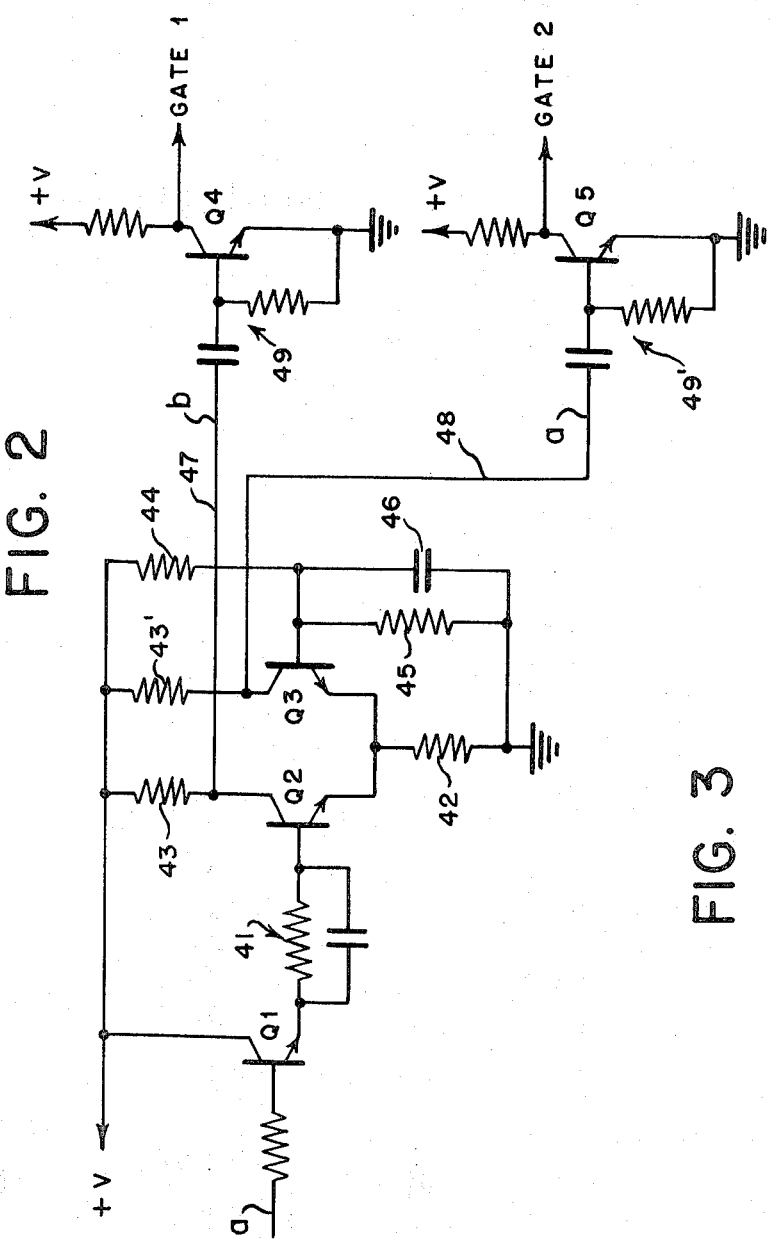
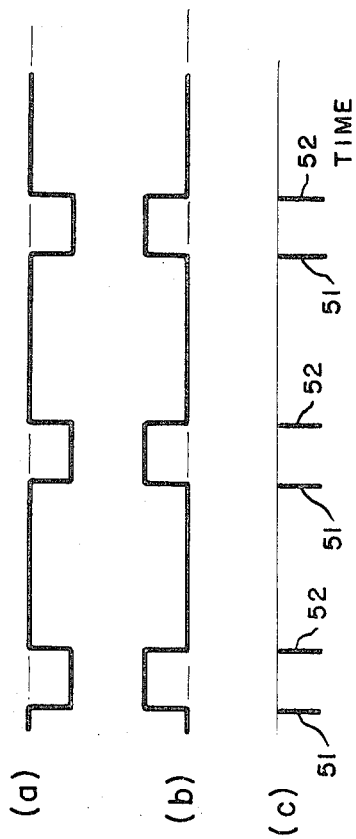
FIG. 2
FIG. 3

3,798,539

PULSE EDDY CURRENT TESTING APPARATUS USING PULSES HAVING A 25% DUTY CYCLE WITH GATING AT PULSE EDGES

BACKGROUND OF THE INVENTION

Eddy current testing apparatus is well-known, and is particularly useful in the non-destructive testing of conductive objects to determine defects or flaws therein. In such apparatus a test coil assembly is energized to induce eddy currents in an object under test, and responds to changes in the eddy current flow to produce output signals varying with defects or flaws in the object.

In one type of apparatus objects of uniform cross-section such as bars, tubes, wires, etc. are continuously passed through a primary coil in the coil assembly, and a pair of secondary coils connected in series opposition produce a null output when the eddy current field is uniform. Then, any discontinuities in the object which alter the eddy current magnitude or distribution will produce output flaw signals which are detected and indicated in a desired manner. Instead of having the object pass through the coil assembly, the assembly may be arranged as a probe which is moved relative to the surface of the object under test.

Another type of eddy current test apparatus operates as a comparator, that is, an object is placed in one set of coils and the resultant signal compared with that of a reference object placed in another set of coils. Here also, the secondary coils are commonly connected in opposition to produce a null signal when the objects are alike, and an output signal when they are unlike.

Pulse excitation is known in which DC pulses are applied to a test coil assembly. In some cases the resultant signal is displayed or otherwise indicated to yield information concerning an object under test. In others a sampling circuit samples the decaying waveform after the applied pulse has terminated, and different portions of the decaying waveform may be sampled by a sliding sampling pulse.

In application Ser. No. 317,140, filed Dec. 21, 1972 by Sven E. Mansson for "Pulse Eddy Current Testing Apparatus," means for generating stable pulses are disclosed in which the duration, amplitude and pulse repetition frequency (PRF) are closely controlled. Means are also described for generating fixed quadrature gate pulses occurring after the termination of each applied pulse, and the gate pulses are applied to respective phase-sensitive detectors. The output signals from the test coil assembly are applied to the phase-sensitive detectors through a tuned amplifier. Applied pulses having a 25 percent duty cycle and an amplifier tuned to the PRF of the applied pulses are disclosed, as well as a test coil assembly yielding an approximately null output in the absence of defects or flaws in the object under test. Duty cycles of less than 25 percent with the amplifier tuned to a frequency such that the pulse width is one-quarter wavelength are also disclosed.

Test coil assemblies have considerable inductance and, when pulses are applied to the primary coil thereof, differentiation commonly occurs which produce spikes at the leading and trailing edges of a pulse. Ringing may also occur. Depending on the pulse duration, PRF and other circuit parameters, such ringing may die out during an applied pulse or may persist after the pulse has terminated. Since the applied pulses are large compared to signals representing defects or flaws, the disturbances accompanying the applied pulses may mask the desired signals. It is believed that these, among other factors, may account for the sampling or gating of the signals after the termination of the applied pulses in prior pulse eddy current testing apparatus.

It has now been found that it is possible to gate the phase-sensitive detectors in apparatus similar to that above-described at the leading and trailing edges of the applied pulses and still retain adequate sensitivity to defects or flaws in the object under test.

SUMMARY OF THE INVENTION

In accordance with the invention, pulses having a pulse width equal to one-quarter wavelength at a multiple (including 1) of the fundamental frequency of the pulses are applied to an eddy current test coil assembly or means, and gate pulses are produced at the leading and trailing edges of the pulses. The output signals from the test coil assembly, varying with defects or flaws in the object under test, are applied to an amplifier tuned to said multiple of the fundamental frequency of the applied pulses. The output of the tuned amplifier is supplied to a pair of phase-sensitive detectors along with the gate pulses to produce quadrature signal components of the signals supplied thereto.

Pulses having a 25 percent duty cycle with the amplifier tuned to the PRF thereof are particularly contemplated. The fundamental frequency of such pulses is the same as the PRF. Thus gate pulses produced at the leading and trailing edges of the pulses are in phase-quadrature with respect to the fundamental frequency. For some applications it may be desired to use lower duty cycles. In such case, if the pulse width is equal to one-quarter wavelength at a harmonic of the fundamental frequency, and the amplifier is tuned to such harmonic, gate pulses developed at the leading and trailing edges will be in phase-quadrature at that harmonic. For example if pulses having a 12½ percent duty cycle are employed, and the amplifier is tuned to the second harmonic of the fundamental frequency (also called the first harmonic) gate pulses produced at the leading and trailing edges of the applied pulses will be in phase-quadrature with respect to the second harmonic. Thus, in general, if the pulses have a pulse width equal to one-quarter wavelength at a multiple (including 1) of the fundamental frequency (PRF) of the pulses, and the amplifier is tuned to that multiple, gate pulses produced at the leading and trailing edges of the pulses will be in phase-quadrature with respect to the tuned frequency.

It is believed that the tuning of the amplifier to the PRF of the applied pulses, or a multiple of the PRF, is primarily responsible for eliminating the disturbances arising during an applied pulse, so that adequate sensitivity to defects or flaws is obtained. However, it is preferred to reduce the amplitude of the direct pulses in the signal output of the test coil assembly to a low level, as by connecting output coils thereof to produce approximately a null output to the tuned amplifier in the absence of defects or flaws in the object under test. It has been found that precise nulling is not required, so that construction of the coil assembly is facilitated.

While it might appear that gating at the leading edge of an applied pulse would not yield a useful signal, since the pulse has just begun, it is found in practice that with the amplifier tuned to the PRF (or to a multiple thereon as discussed above) and the second gate produced at the trailing edge (and hence in quadrature with the leading gate with respect to the tuned frequency) good results are obtained.

BRIEF DESCRIPTION OF THE DRAWINGS

FIG. 2 is a circuit diagram of a gate generator in accordance with the invention; and FIG. 3 shows waveforms for FIG. 2.

DESCRIPTION OF THE SPECIFIC EMBODIMENTS

Figure 1:
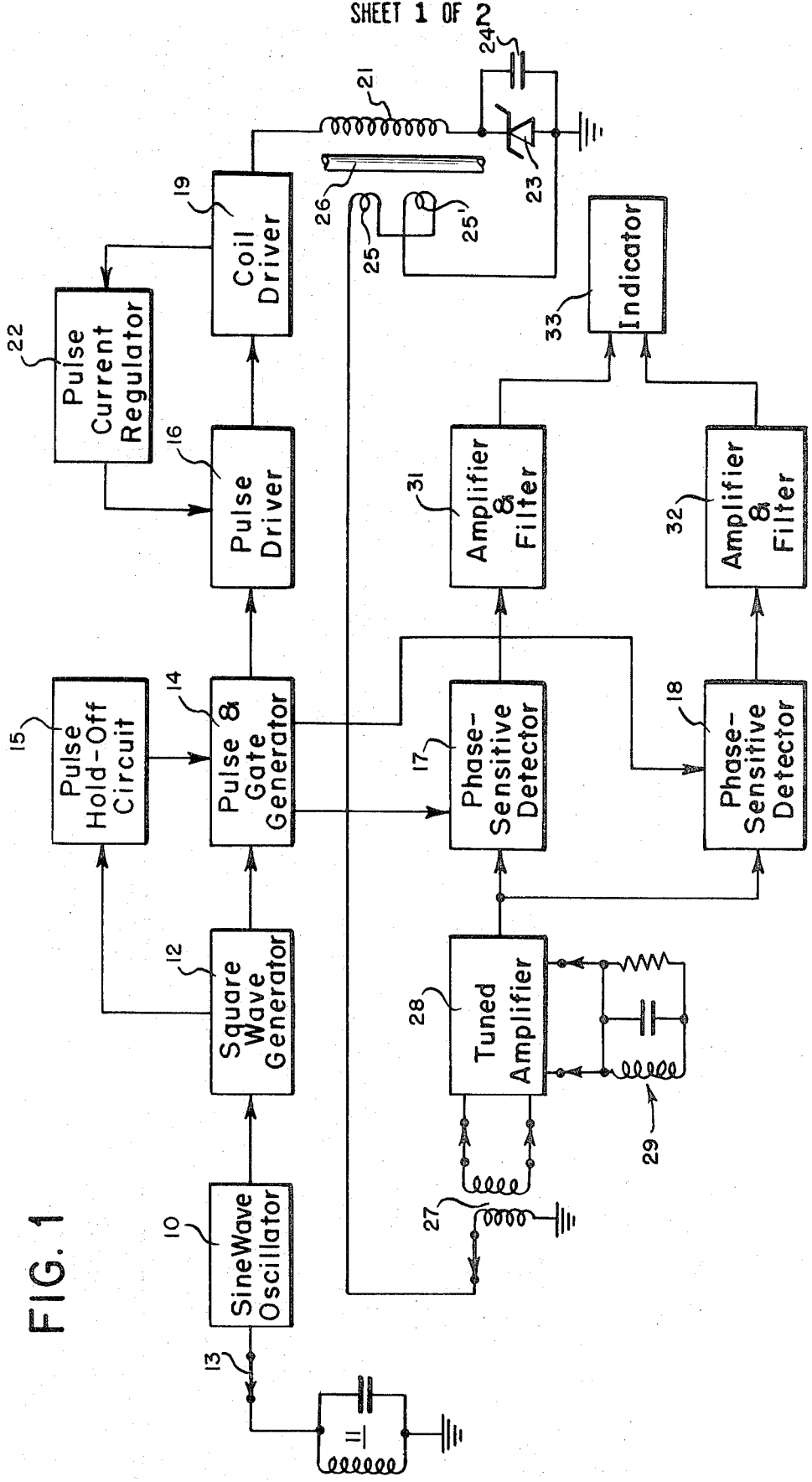
FIG. 1 is a block diagram of a pulse eddy current flaw detector in which the invention may be employed.

Referring to FIG. 1, a sine wave oscillator 10 including a tank circuit 11 supplies a sine wave to a square wave generator 12. Different tank circuits may be connected to oscillator 10 through switch 13 so that the frequency of the sine wave can be selected as desired. Outputs of the square wave generator are supplied to a pulse and gate generator 14 and to a pulse hold-off circuit 15.

The pulse hold-off circuit functions to alternately allow and prevent the production of output pulses by the pulse generator in 14, so that the output pulses correspond to regularly recurring non-sequential excursions of one polarity of the square wave supplied to the pulse generator. According output pulses are supplied to pulse drive 16 of desired duty cycle in which the pulses are precisely related in time occurrence and duration to the half-cycles in the input square wave which are not eliminated by the hold-off circuit. Thus, if alternate excursions of one polarity of the input square wave are eliminated, output pulses of 25 percent duty cycle and a PRF (pulse recurrence frequency) half the frequency of the input square wave, and hence half the frequency of the initial sine way, may be produced.

Other duty cycles may be obtained by modifying the hold-off circuit to eliminate the effect of more than one excursion of one polarity before the next excursion is passed to pulse driver 16. For example, if three intervening excursions are eliminated, output pulses of 12½percent duty cycle and a PRF one-quarter the frequency of the input square wave, and hence one-quarter the frequency of the initial sine wave, may be produced.

Inasmuch as the pulse width will still be one-half cycle of the initial sine wave, at 25 percent duty cycle the pulse width will be one-quarter wavelength of the fundamental frequency of the pulses, and at 12½percent duty cycle the pulse width will be one-quarter wavelength at the second harmonic.

Generator 14 also produces quadrature gating pulses which are supplied to phase-sensitive detectors 17, 18.

Output pulses from the pulse driver 16 are fed to coil driver 19 and thence to the primary winding 21 of an eddy current flaw detector coil assembly. A pulse current regulator 22 is provided to insure that constant current pulses are applied to the primary coil, and is described and claimed in application Ser. No. 328,889, filed Feb. 1, 1973, by Sven E. Mansson for Current Regulator For Pulse Eddy Current Tester. A Zener diode 23 and shunt capacitor 24 provides a discharge path to release the energy stored in primary 21 at the end of a driving pulse, and is also described in the aforesaid application.

Two secondary coils 25, 25' are connected in series opposition to form a null coil arrangement which yields little or no output in the absence of a flaw or other irregularity in the object 26 fed therethrough, but yields an output varying in amplitude and/or phase in the presence of a flaw or other irregularity. The output of the null coils is supplied through a switchable transformer 27 to a tuned amplifier 28 which includes a switchable tuned circuit 29. Different transformers and tuned circuits may be switched into operation along with the switching of the oscillator tank circuit 11.

With driving pulses of 25 percent duty cycle applied to primary coil 21, there will be a strong frequency component at the PRF of the pulses in the secondary coils in the presence of flaws, etc. Tuning the amplifier 28 to the PRF of the driving pulses is found to yield a maximum signal response to flaws, etc. Also, the tuning serves to reduce noise and undesired frequency components which may exist in the output of null coils 25, 25'. The bandwidth of the tuned amplifier should be sufficient to encompass side-bands resulting from flaws, etc.

With a 12½percent duty cycle, there will be a second harmonic of reasonable strength, and tuning the amplifier to twice the fundamental frequency of the PRF may give useful results. Still smaller duty cycles and tuning to higher harmonics may be useful for some applications, such as 6¼percent duty cycle and tuning to four times the fundamental frequency.

The output of the tuned amplifier 28 is supplied to the phase-sensitive detectors 17, 18, along with the quadrature gates from generator 14, to produce quadrature signal components. These are fed to respective amplifiers and filters 31, 32 and then to an indicator 33 such as a cathode-ray tube, in accordance with known practice.

The above arrangement and specific circuits for generating the pulses are described in the aforesaid application Ser. No. 317,140. It will be understood that the present invention is not limited to the specific arrangement shown, and may be employed in other types of pulsed eddy current testing apparatus and with other means for generating pulses having the desired duty cycle.

Referring to FIGS. 2 and 3, a gate generator is shown for developing gate pulses at the leading and trailing edges of the pulses applied to the test coil assembly. Letters *a* and *b* in FIG. 2 refer to corresponding waveforms in FIG. 3. The transistors in FIG. 2 are of the NPN type with the emitter arrow pointing away from the base, but it will be understood that PNP transistors could be employed if desired, with appropriate change of voltages, etc., as will be understood by those skilled in the art.

Pulses having a duty cycle of 25 percent are shown in FIG. 3(*a*). They are produced in generator 14 (FIG. 1) and have the same duration and time occurrence as the drive pulses applied to primary 21 of the test coil assembly. As specifically shown, the pulses are negative going and are applied to the input of transistor Q1 functioning as an emitter follower and serving as a buffer to avoid loading the coil driving circuit. The output Q1 is supplied through a coupling circuit 41 to a differential amplifier comprising transistors Q2, Q3, a common emitter resistor 42 and respective load resistors 43, 43'. The base of Q3 is biased by a voltage divider comprising resistors 44, 45, the latter being shunted by capacitor 46.

The differential amplifier yields an output in line 47 which is inverted with respect to the input of Q1, as shown in FIG. 3(b). The output in line 48 is the same as shown in FIG. 3(a). The pulses are applied to C-R differentiating circuits 49, 49' connected to the inputs of Q4 and Q5. Considering the upper differentiating circuit, short positive and negative spikes will be produced at the leading and trailing edges of the pulses in FIG. 3(b). However, Q4 is normally off, and negative input spikes will have no effect. Hence, only the positive differentiated spikes will be effective to turn Q4 on, and change the collector potential from +V to nearly ground level. Thus negative-going early gate pulses 51 are produced at the output of Q4. In the lower differentiating circuit negative and positive spikes will be produced at the leading and trailing edges of the pulses of FIG. 3(a). The negative spikes will have no effect on Q5, and the positive spikes will yield late gate pulses 52 in the output of Q5. The gate pulses 51 and 52 are supplied to respective phase-sensitive detectors 17 and 18 (FIG. 1).

As will be noted, the gate producing circuitry is quite simple and, since the gates are produced from the same pulses which are used to drive the test coil 21 (FIG. 1), proper timing is assured. Since the duty cycle of the applied pulses is 25 percent, and the amplifier 28 is tuned to the PRF, the gate pulses will be one-quarter wavelength apart with respect to the tuned frequency and hence in phase quadrature. As the PRF is changed by switching components, as described above, the gate pulses will remain in phase quadrature. For large ranges of PRF's, say from 2.5 KH to 600 KH, it may be desirable to reduce the value of the resistors in the differentiating circuits 49, 49' at the higher pulse rates. In such case, short-circuiting transistors may be connected across respective portions of the resistors, and actuated along with the switchable components.

Due to the tuning of amplifier 28, the signal passing therethrough will be substantially sinusoidal and will vary in amplitude and/or phase when defects or flaws are present in the object under test. The quadrature gating of detectors 17, 18 will develop respective quadrature signal components from the output signals of the amplifier, which may then be processed and indicated as desired.

In the event smaller duty cycles are employed wherein the pulse width is equal to one-quarter wavelength at a multiple of the fundamental frequency of the pulses, and the amplifier is tuned to that multiple, the gate signals may still be produced from the driving pulses as described above, and will be quadrature-related to the tuned frequency of the amplifier.

The invention has been described in connection with a preferred embodiment thereof. It will be understood that other circuits may be employed for producing the gate pulses, as meets the requirements of a particular application or the judgment of the designer.

We claim:

1. Pulse eddy current testing apparatus which comprises
   a. a pulse generator for producing regularly recurring pulses having a pulse width equal to one-quarter wavelength at a multiple (including 1) of the fundamental frequency of said pulses,
   b. test coil means supplied with said pulses for inducing eddy currents in an object under test and producing output signals varying with defects or flaws in the object,
   c. an amplifier tuned to substantially said multiple of the fundamental frequency of the pulses supplied to said test coil means and supplied with the output signals thereof,
   d. means for producing gate pulses at the leading and trailing edges of said pulses,
   e. a pair of phase-sensitive detectors supplied with said gate pulses and with the output of said tuned amplifier for producing quadrature signal components thereof,
   f. and means for utilizing the signal components from said phase-sensitive detectors to produce indications of said defects or flaws in the object under test.

2. Apparatus in accordance with claim 1 in which said pulses supplied to the test coil means have a 25 percent duty cycle and said amplifier is tuned to the PRF thereof.

3. Apparatus in accordance with claim 1 in which said test coil means includes output coils connected to produce approximately a null output to said tuned amplifier in the absence of defects or flaws in said object.

4. Apparatus in accordance with claim 1 in which said means for producing gate pulses includes a pair of differentiating circuits supplied with said pulses from the pulse generator and designed and adapted to differentiate the leading and trailing edges thereof, respectively.

5. Pulse eddy current testing apparatus which comprises
   a. a pulse generator for producing pulses having a 25 percent duty cycle,
   b. test coil means supplied with said pulses for inducing eddy currents in an object under test and producing output signals varying with defects or flaws in the object,
   c. an amplifier tuned to the PRF of the pulses supplied to the test coil means and supplied with the output signals thereof,
   d. means for producing gate pulses at the leading and trailing edges of said 25 percent duty cycle pulses,
   e. a pair of phase-sensitive detectors supplied with said gate pulses and the output of said tuned amplifier for producing quadrature-signal components thereof,
   f. and means for utilizing the signal components from said phase-sensitive detectors to produce indications of said defects of flaws in the object under test.

6. Apparatus in accordance with claim 5 in which said test coil means includes output coils connected to produce approximately a null output to said tuned amplifier in the absence of defects or flaws in said object.

7. Apparatus in accordance with claim 6 in which said means for producing gate pulses includes a pair of differentiating circuits supplied with pulses corresponding to said 25 percent duty cycle pulses and designed and adapted to differentiate the leading and trailing edges thereof, respectively.

8. Apparatus in accordance with claim 5 in which said means for producing gate pulses includes a differential amplifier supplied with pulses corresponding to said 25 percent duty cycle pulses and yielding corresponding inverted and non-inverted pulse outputs, and a pair of differentiating circuits supplied with said pulse outputs respectively, said differentiating circuits being designed and adapted to produce gate pulses of the same polarity at respective leading and trailing edges of the pulses supplied thereto.

9. Apparatus in accordance with claim 8 in which said test coil means includes output coils connected to produce approximately a null output to said tuned amplifier in the absence of defects or flaws in said object.

* * * * *